United States Patent [19]

DeVale et al.

[11] Patent Number: 4,536,845
[45] Date of Patent: Aug. 20, 1985

[54] SELF-PROGRAMMABLE CONTROLLER FOR WATER CONDITIONER RECHARGING

[75] Inventors: Donald P. DeVale, Sycamore; Stanley F. Rak, Mundelein, both of Ill.

[73] Assignee: Culligan International Company, Northbrook, Ill.

[21] Appl. No.: 528,242

[22] Filed: Aug. 31, 1983

[51] Int. Cl.³ .................... G06F 15/46; B01D 21/24
[52] U.S. Cl. ............................ 364/500; 210/96.1; 210/98; 210/140; 210/143; 210/662
[58] Field of Search ............... 364/140, 500, 502; 210/662, 670, 89, 96.1, 98, 138, 140, 141, 143

[56] References Cited

U.S. PATENT DOCUMENTS

| 4,237,538 | 12/1980 | Le Dall | 364/500 |
| 4,246,101 | 1/1981 | Selby | 210/662 X |
| 4,275,448 | 6/1981 | Le Dall | 364/500 |
| 4,385,357 | 5/1983 | Davis et al. | 364/500 |
| 4,426,294 | 1/1984 | Seal | 210/662 |

Primary Examiner—Joseph Ruggiero
Attorney, Agent, or Firm—George H. Gerstman

[57] ABSTRACT

A process is provided for controlling the recharging of a water conditioner. Water usage during selected fractions of a predetermined period of time is sensed. Information signifying the water usage during the selected fractions is stored. A time fraction is automatically determined, based on the stored information, when water is unlikely to be used. A selected parameter, such as volume of water used since recharging, is sensed to determine if recharging is required. The water conditioner is recharged during the automatically determined time fraction if the selected parameter indicates that recharging is required.

19 Claims, 7 Drawing Figures

SELF-PROGRAMMABLE CONTROLLER FOR WATER CONDITIONER RECHARGING

BACKGROUND OF THE INVENTION

The present invention concerns a novel process and system for controlling the recharging of a water conditioner. The water conditioner may be a water softener, a water filter or any other item used for conditioning or treating water. The recharging may include the recharging of an ion exchange resin for the water softener, the backwashing of a filter, or any other reconstituting of an element used in the conditioning of water.

In the use of household water softeners, it is desirable to recharge or regenerate the ion exchange bed at a time during which the water is not being used in the household. Often a clock is used in connection with the recharging system and the clock is manually preset for a time of day that is generally a low water usage period, such as 2:00 a.m.

If a single flow water usage period during a day is selected, such as 2:00 a.m. to 3:00 a.m., the water softening unit will have to have a 24-hour reserve capacity because recharging will occur only once a day. Additionally, although the installer of the water softener may have set the clock for 2:00 a.m. to 3:00 a.m., this time may not reflect an accurate time during which water is not being used in certain households. Adjustment by persons in the household may be necessary.

Using the aforesaid clock system, a power outage will cause the time period to be erroneous. For example, if the clock is set for 2:00 a.m. recharging, a 5-hour power outage may cause recharging to occur when the family in the household has awakened and is using a maximum amount of water.

It is an object of the present invention to provide a process and system for controlling the recharging of a water conditioner, which does not require a manual clock setting but is instead automatically programmable.

Another object of the present invention is to provide a system and process for controlling the recharging of a water conditioner, in which a recharging time period is automatically determined based on historical information regarding non-water usage.

Other objects and advantages of the present invention will be apparent as the description proceeds.

SUMMARY OF THE INVENTION

In accordance with the present invention, a process is provided for controlling the recharging of a water conditioner. The process comprises the steps of sensing if the water is being used during selected fractions of a predetermined period of time; storing information signifying water usage during the selected fractions; automatically determining a time fraction, based on the stored information, when water is unlikely to be used; sensing a selected parameter to determine if recharging is required; and recharging the water conditioner during the determined time fraction if the selected parameter indicates that recharging is required.

In one embodiment of the invention the selected parameter is the volume of water used since recharging. In another embodiment, the selected parameter is the water quality. In another embodiment, the selected parameter is the salt level of the water.

In one embodiment, the water conditioner is a water softener and the selected parameter is the condition of the ion exchange resin bed. In another embodiment, the water conditioner is a water filter system and the selected parameter is the condition of the filter.

The system for controlling the recharging of a water conditioner in accordance with the present invention comprises means for sensing if water is being used during selected fractions of a predetermined period of time. Means are provided for storing information signifying water usage during the selected fractions. Means are provided for automatically determining a time fraction, based on the stored information, when water is unlikely to be used. Means are provided for sensing a selected parameter to determine if recharging is required. Means are provided for recharging the water conditioner during the determined time fraction if the selected paramater indicates that the recharging is required.

In the illustrative embodiment, the system for controlling the recharging of a water conditioner comprises a microprocessor-based system utilizing a ROM containing a novel program and utilizing an $E^2$ PROM for storage of information.

A more detailed explanation of the invention is provided in the following description and claims, and is illustrated in the accompanying drawings.

DETAILED DESCRIPTION OF THE ILLUSTRATIVE EMBODIMENT

Figure 1:
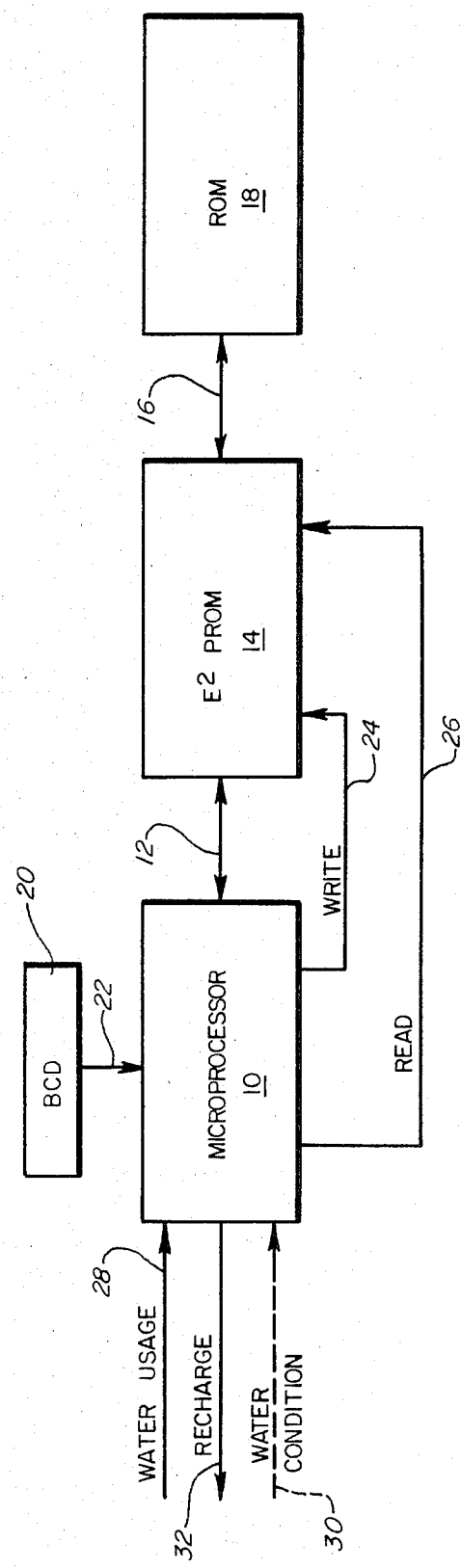
FIG. 1 is a schematic block diagram of a system for controlling the recharging of a water conditioner, constructed in accordance with the principles of the present invention.
Figure 2:
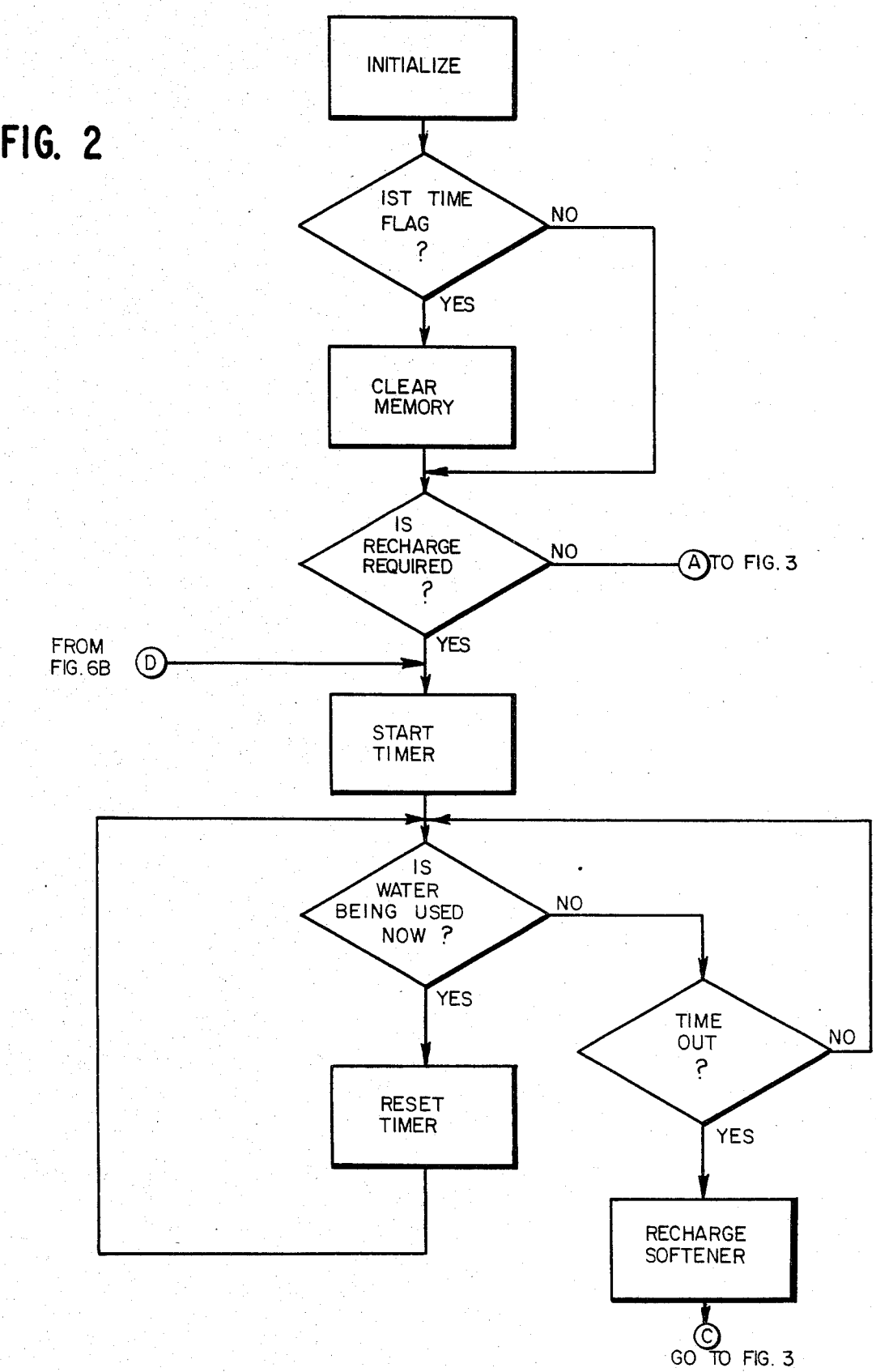
FIGS. 2–7, when connected together, are a flow diagram of a process for controlling the recharging of a water conditioner, utilized with the system illustrated in FIG. 1.
Figure 3:
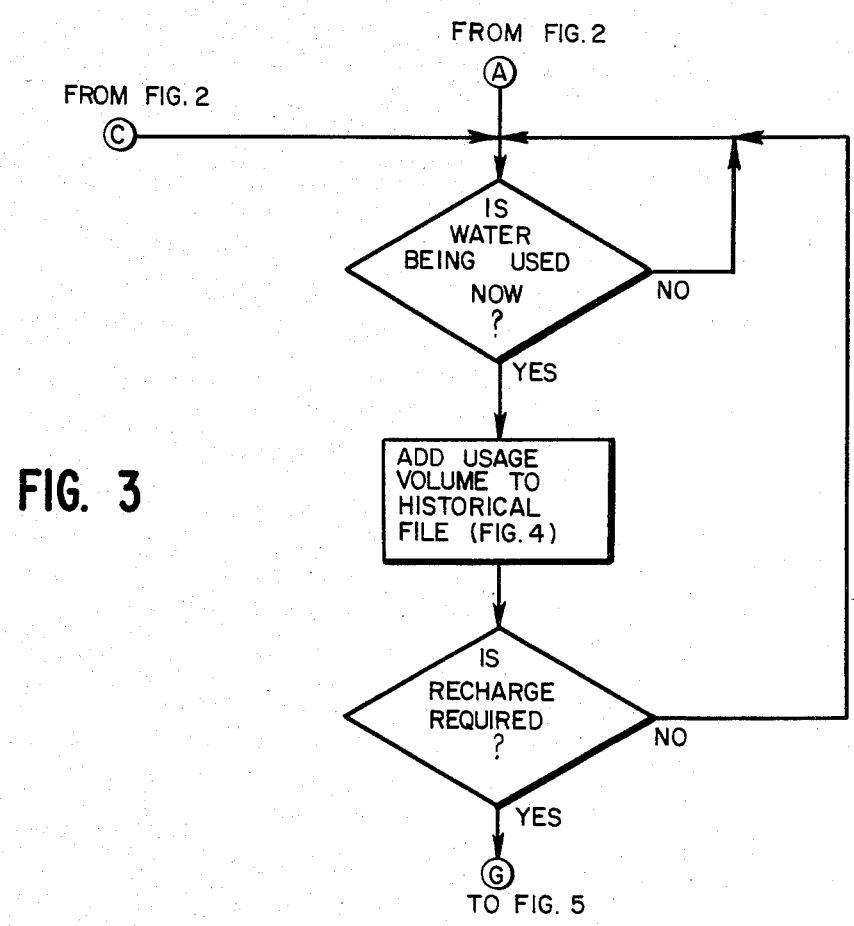
Figure 4:
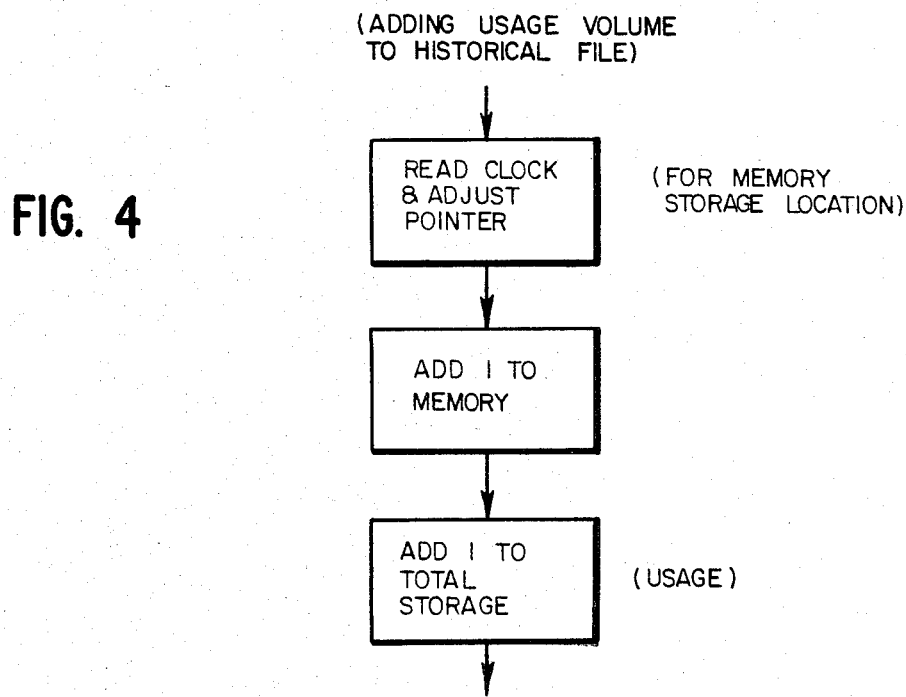
Figure 5:
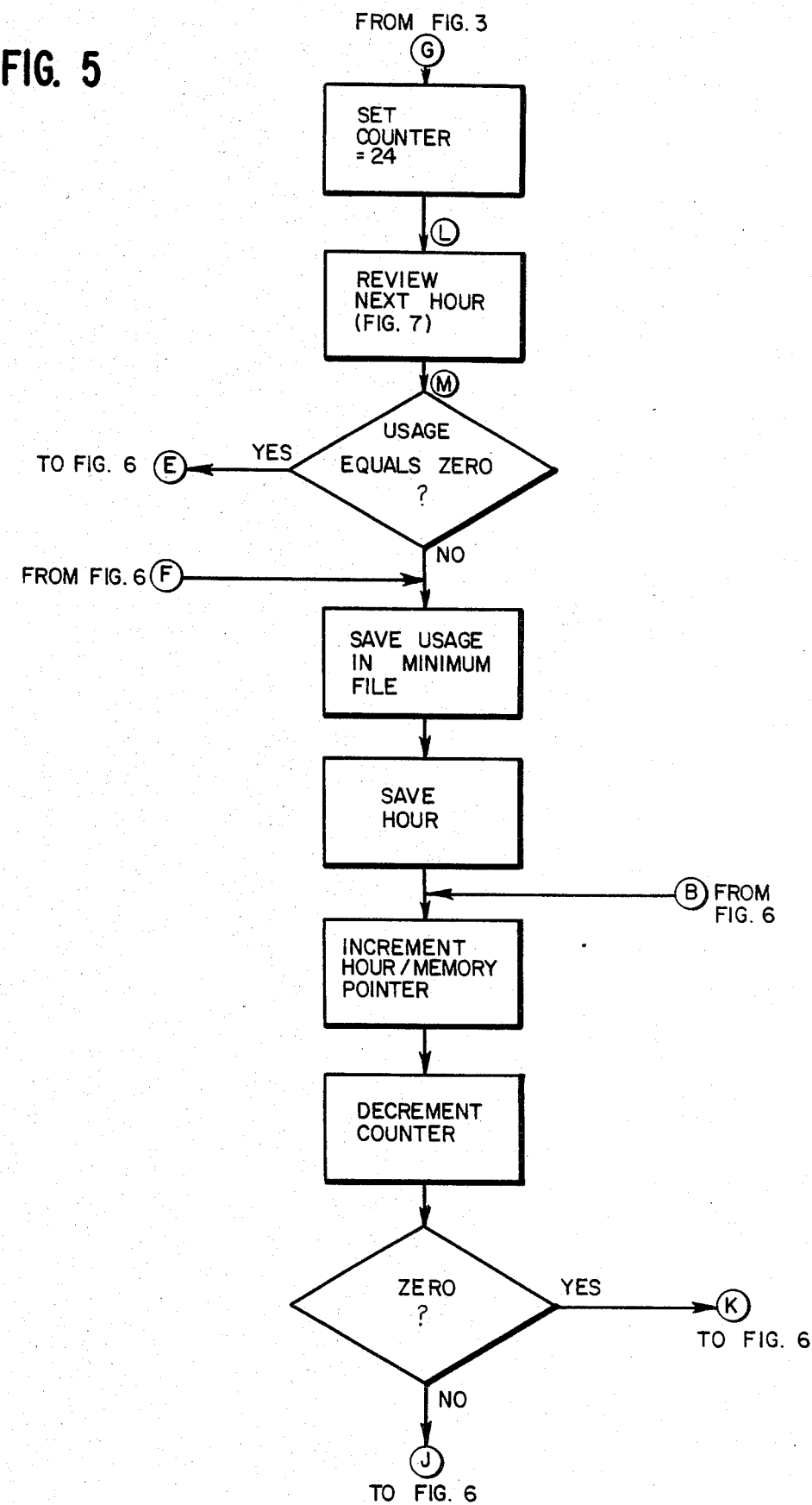
Figure 6:
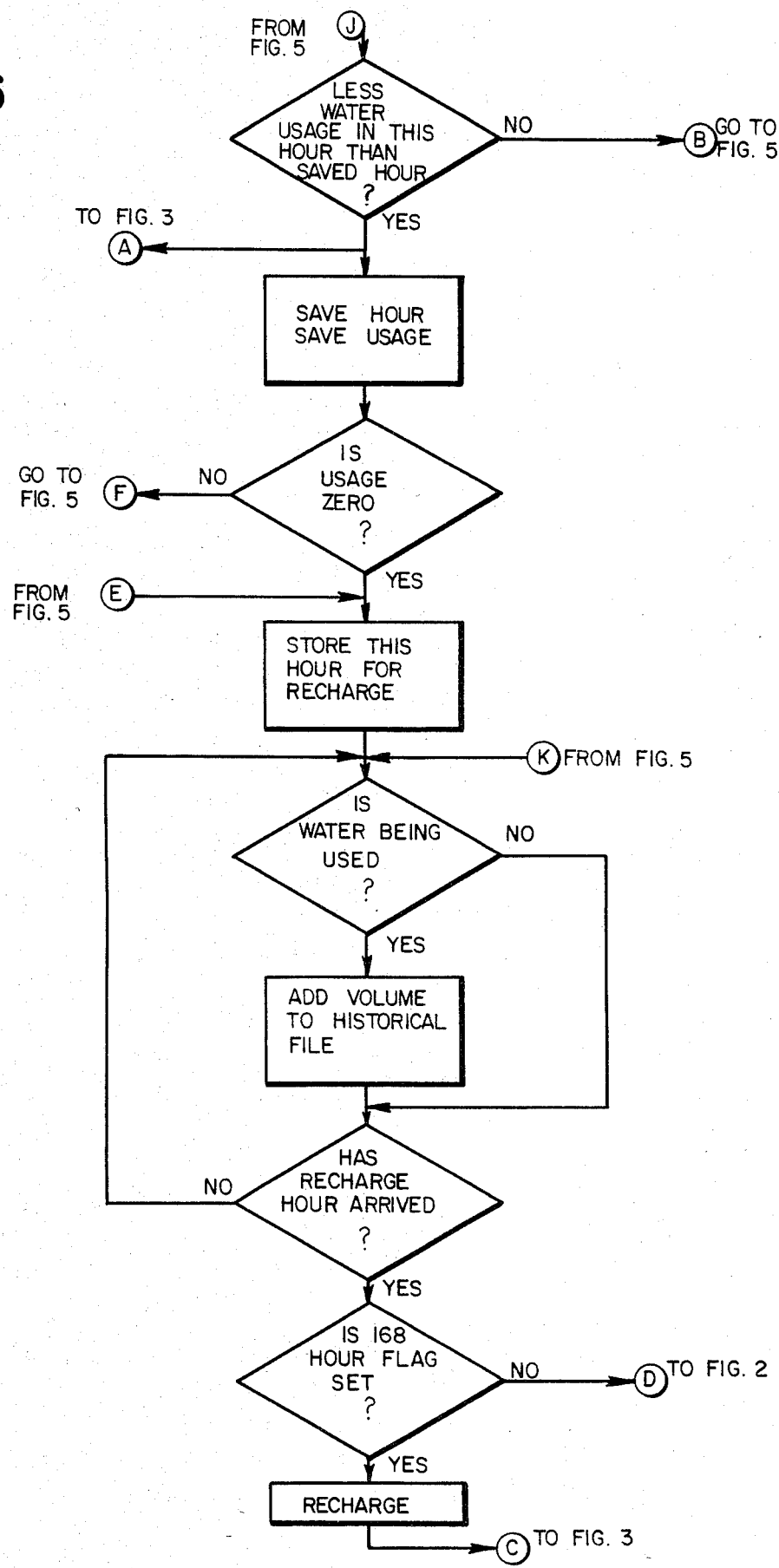
Figure 7:
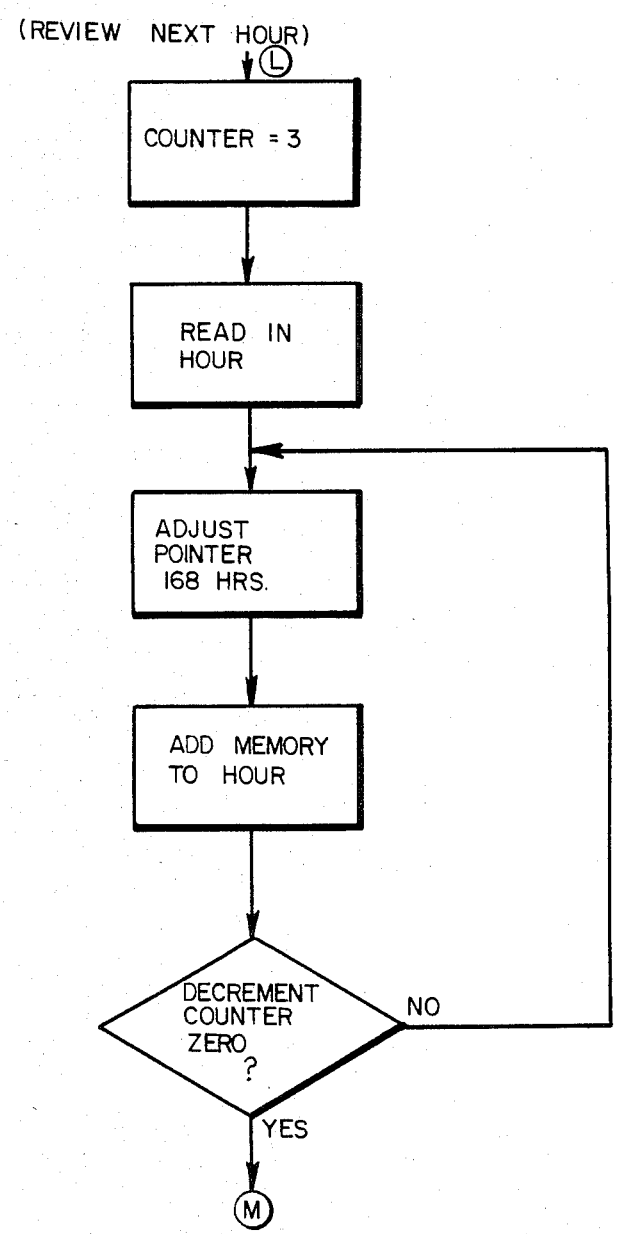

Referring to FIG. 1, the system for controlling the recharging of a water conditioner comprises a microprocessor 10 connected via bidirectional lines 12 to an $E^2$ PROM 14. $E^2$ PROM 14 is connected via bidirectional lines 16 to a ROM 18 containing an operating program. A manually-operated binary coded decimal switch 20 is connected via line 22 to microprocessor 10. There is a write line 24 from microprocessor 10 to $E^2$ PROM 14 and a read line 26 from microprocessor 10 to $E^2$ PROM 14.

ROM 18 may be in the form of a PROM which is used to store the basic program. $E^2$ PROM 14 is used to store the timing and water usage and condition information which is changed from time to time.

There can be various inputs to the system to determine whether recharging is appropriate. In the illustrative embodiment, water usage is sensed and a signal which signifies the water usage is presented via line 28 to an input of microprocessor 10. Alternatively, the water condition may be sensed and a signal signifying the condition of the water may be presented via line 30 to microprocessor 10. Microprocessor 10 has an output 32 which provides a signal for recharging the water conditioner.

If desired, a number of events may be sensed in order to determine whether recharging is needed. For example, one of the sensed conditions may be volume of water used since the last recharging. Another condition that is sensed may be the specific condition of the water. Another condition that is sensed may be the salt level of the water. Another condition that is sensed may be the condition of an ion exchange resin bed in a water softener. Another condition that is sensed may be the condition of the filter in a water filter system. No limitation is intended with respect to the specific condition that is sensed to determine whether recharging is needed, other than as set forth in the appended claims.

Although no limitation is intended, microprocessor 10 could comprise an 8031 microprocessor chip which contains its own RAM space or it may comprise an 8051 microprocessor chip which contains its own PROM space.

Now referring to FIGS. 2–7, a flow diagram is shown therein regarding a program usable with the system of FIG. 1. In order to understand the flow diagram, it should be noted that there is an historical file which is stored in the $E^2$ PROM 14. The historical file comprises a series of memory locations, each corresponding to a particular hour over a four-week period. Thus in the illustrative embodiment, a predetermined period of time of four weeks is selected and sensing is provided to determine if water is being used during the selected fraction of one hour over the predetermined four-week period. Thus there is a total of 672 storage locations.

In the illustrative embodiment, the system uses volume to determine whether recharging is needed. Thus the amount of volume of water used since the previous recharging is the determining factor. For example, if the recharge point has been determined to be, typically, 500 gallons since the previous recharging occurred, once 500 gallons have flowed the system is set so that it will indicate that a recharge is required. It is desirable that the volume selected to determine if recharging is necessary is between 200 gallons of water and 1,000 gallons of water, although the illustrative embodiment will utilize 500 gallons as the determining volume.

Referring to the Figures, the system is initialized by first checking whether this is the first time that the system is being used. If it is not the first time that the system is being used, the volume storage is checked to determine whether recharging is required. On the other hand, if it is the first time that the system is being used, the memory is cleared and the total volume storage is checked to determine whether recharging is required.

If recharging is not required (see FIG. 3), it is determined whether water is presently being used. If water is not presently being used, monitoring is continued until water is being used. Once water is being used, the volume of the water is added to the historical file and then a determination is made if recharging is required by noting if sufficient volume (500 gallons) has been used. If the 500 gallons has been used (see FIG. 5), the counter is set and the next hour is reviewed (see FIG. 7).

In the preview of the next hour, the counter is set to three (to designate the current week and the next three consecutive weeks). The hour is read in and the pointer is adjusted plus 168 hours to add that week to the current week in the memory. Looping is continued three times so that the sum of the hourly usage for all four weeks is added into the memory. It is then determined whether usage equals zero. If usage equals zero, the hour for recharge is stored. If the usage does not equal zero, the usage is saved in a minimum file. The minimum file is in RAM. The hour is saved and the hour is incremented with the memory pointer. The counter is decremented and checked to determine whether the counter has decremented to zero. If it has not decremented to zero, a comparison is made to determine whether the hour is less than the saved hour. If it is less than the saved hour, the new hour is saved and then it is determined whether the usage is zero. If the usage is zero, this zero is saved for recharge.

A determination is then made if water is being used. If water is not being used, a check is made whether the recharge hour has arrived. If it has arrived, a check is made whether the 168-hour flag is set. If the 168-hour flag is set, a recharge signal is provided.

There are various combinations of steps depending upon the sensed conditions, and these combinations of steps are evident from the flow diagram set forth in FIGS. 2–8. By referring to the Figures, it can be seen that water usage is sensed during hourly intervals of a four-week period of time. Information signifying the water usage during the hourly interval is stored in memory. Based on the historical stored information, a time fraction when water is unlikely to be used is automatically determined. The volume of the water that has been used since the previous recharging is sensed to determine if another recharging is required. If another recharging is required, and the hour has occurred when water is unlikely to be used, the water conditioner is recharged.

Although an illustrative embodiment of the invention has been shown and described, it is to be understood that various modifications and substitutions may be made without departing from the novel spirit and scope of the present invention.

What is claimed is:

1. A process for controlling the recharging of a water conditioner, which comprises the steps of:
   sensing if water is being used during selected fractions of a predetermined period of time;
   storing information signifying water usage during said selected fractions;
   automatically determining a time fraction, based on the stored information, when water is unlikely to be used;
   sensing a selected parameter to determine if recharging is required; and
   recharging the water conditioner during said determined time fraction if said selected parameter indicates that recharging is required.

2. A process as described in claim 1, wherein said selected parameter is volume of water used since recharging.

3. A process as described in claim 1, wherein said selected parameter is the water quality.

4. A process as described in claim 1, wherein said selected parameter is the salt level of the water.

5. A process as described in claim 1, wherein the water conditioner is a water softener and said selected parameter is the condition of the ion exchange resin bed.

6. A process as described in claim 1, wherein the water conditioner is a water filter system and said selected parameter is the condition of the filter.

7. A process as described in claim 1, wherein said predetermined period of time is four weeks and said selected fraction is one hour.

8. A process as described in claim 1, wherein said predetermined period of time is less than four weeks and said selected fraction is no more than one hour.

9. A process as described in claim 2, wherein said volume selected to determine if recharging is necessary is between 200 gallons of water and 1,000 gallons of water.

10. A system for controlling the recharging of a water conditioner, which comprises:
- means for sensing if water is being used during selected fractions of a predetermined period of time;
- means for storing information signifying water usage during said selected fractions;
- means for automatically determining a time fraction, based on the stored information, when water is unlikely to be used;
- means for sensing a selected parameter to determine if recharging is required; and
- means for recharging the water conditioner during said determined time fraction if said selected parameter indicates that recharging is required.

11. A system as described in claim 10, wherein said information storing means comprises an $E^2$ PROM.

12. A system as described in claim 10, wherein said selected parameter is volume of water used since recharging.

13. A system as described in claim 10, wherein said selected parameter is the water quality.

14. A system as described in claim 10, wherein said selected parameter is the salt level of the water.

15. A system as described in claim 10, wherein the water conditioner is a water softener and said selected parameter is the condition of the ion exchange resin bed.

16. A system as described in claim 10, wherein the water conditioner is a water filter system and said selected parameter is the condition of the filter.

17. A system as described in claim 10, wherein said predetermined period of time is four weeks and said selected fraction is one hour.

18. A system as described in claim 10, wherein said predetermined period of time is less than four weeks and said selected fraction is no more than one hour.

19. A system as described in claim 12, wherein said volume selected to determine if recharging is necessary is between 200 gallons of water and 1,000 gallons of water.

* * * * *

UNITED STATES PATENT AND TRADEMARK OFFICE
CERTIFICATE OF CORRECTION

PATENT NO. : 4,536,845
DATED : August 20, 1985
INVENTOR(S) : Stanley F. Rak

It is certified that error appears in the above-identified patent and that said Letters Patent is hereby corrected as shown below:

On the title page, Item /19/ "DeVale et al." should read

-- Rak et al. --.

Item /75/ should read -- Stanley F. Rak, Mundelein;

Donald P. DeVale, Sycamore, both of Ill. --.

Signed and Sealed this

Twenty-fourth Day of June 1986

[SEAL]

Attest:

DONALD J. QUIGG

Attesting Officer

Commissioner of Patents and Trademarks